United States Patent
Rossbach et al.

(10) Patent No.: US 12,137,368 B2
(45) Date of Patent: Nov. 5, 2024

(54) COMMUNICATION COORDINATION AND POWER SAVING TECHNIQUES FOR EXTENDED REALITY APPLICATIONS

(71) Applicant: Apple Inc., Cupertino, CA (US)

(72) Inventors: Ralf Rossbach, Munich (DE); Fangli Xu, Beijing (CN); Haijing Hu, Beijing (CN); Murali Narasimha, San Ramon, CA (US); Sarma V. Vangala, Campbell, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 364 days.

(21) Appl. No.: 17/441,945

(22) PCT Filed: Jun. 25, 2021

(86) PCT No.: PCT/CN2021/102465
§ 371 (c)(1),
(2) Date: Sep. 22, 2021

(87) PCT Pub. No.: WO2022/267032
PCT Pub. Date: Dec. 29, 2022

(65) Prior Publication Data
US 2023/0269620 A1    Aug. 24, 2023

(51) Int. Cl.
*H04W 28/02* (2009.01)
*H04W 72/1263* (2023.01)
*H04W 76/10* (2018.01)

(52) U.S. Cl.
CPC ... *H04W 28/0268* (2013.01); *H04W 72/1263* (2013.01); *H04W 76/10* (2018.02)

(58) Field of Classification Search
None
See application file for complete search history.

(56) References Cited

U.S. PATENT DOCUMENTS 11,310,707 B2 * 4/2022 Liu ................ H04W 28/0263
11,784,861 B2 * 10/2023 Aldana ............ H04W 72/1215
                                                    370/336

(Continued)

FOREIGN PATENT DOCUMENTS

| CN | 101815030 A | 8/2010 |
| CN | 111031078 A | 4/2020 |
| CN | 111742530 A | 10/2020 |

OTHER PUBLICATIONS

Extended European Search Report for EP Patent Application No. 21899293.1; 10 pages; Oct. 11, 2022.

(Continued)

*Primary Examiner* — Faiyazkhan Ghafoerkhan
(74) *Attorney, Agent, or Firm* — Kowert, Hood, Munyon, Rankin & Goetzel, P.C.

(57) ABSTRACT

A user equipment (UE) may establish a connection with a network for transmission of a plurality of data bursts further comprising a plurality of data segments. The UE may transmit, to the network, a first data segment corresponding to a first quality of service flow identifier (QFI) associated with a first quality of service (QoS) flow and a second data segment corresponding to a second QFI associated with a second QoS flow. The UE may be configured to map one or more data segments to one or more QFIs based on at least one of a slice type, a frame type, a modulo operation, and a sequence number. The plurality of data bursts may be transmitted according to at least one of one or more configured grants (CGs), one or more dynamic grants (DGs), and one or more instances of the one or more CGs or one or more DGs.

20 Claims, 9 Drawing Sheets

(56) References Cited

U.S. PATENT DOCUMENTS

| | | | |
|---|---|---|---|
| 12,010,053 B2* | 6/2024 | Khoryaev | H04L 5/0094 |
| 12,010,540 B2* | 6/2024 | Xiong | H04W 24/10 |
| 2018/0324631 A1* | 11/2018 | Jheng | H04W 28/0263 |
| 2019/0320362 A1* | 10/2019 | Liu | H04W 28/0263 |
| 2020/0236578 A1* | 7/2020 | Cakulev | H04L 47/245 |
| 2020/0236878 A1* | 7/2020 | Millar | F04B 49/065 |
| 2020/0275304 A1* | 8/2020 | Zhao | H04W 28/12 |
| 2021/0058970 A1* | 2/2021 | Kwak | H04L 5/0064 |
| 2021/0194740 A1* | 6/2021 | Aldana | H04W 72/1268 |
| 2023/0269620 A1* | 8/2023 | Rossbach | H04W 76/10 370/329 |

OTHER PUBLICATIONS

Samsung "Reflective QoS discussion"; SA WG2 Meeting #127bis S2-185287; Newport Beach, USA; 5 pages; May 28, 2018.
International Search Report and Written Opinion for PT/CN2021/102465; 9 pages; Mar. 23, 2022.

* cited by examiner

COMMUNICATION COORDINATION AND POWER SAVING TECHNIQUES FOR EXTENDED REALITY APPLICATIONS

PRIORITY CLAIM INFORMATION

This application is a U.S. National Stage application of International Application No. PCT/CN2021/102465, filed Jun. 25, 2021, titled "Communication Coordination and Power Saving Techniques for Extended Reality Applications", which is hereby incorporated by reference in its entirety.

FIELD

The present application relates to wireless devices, and more particularly to apparatuses, systems, and methods for coordinating communication and providing power saving techniques for extended reality applications operating in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The increasing number of features and functionality introduced in wireless communication devices also creates a continuous need for improvement in both wireless communications and in wireless communication devices. In particular, it is important to ensure the accuracy of transmitted and received signals through user equipment devices (UEs), e.g., through wireless devices such as cellular phones, base stations and relay stations used in wireless cellular communications. Under some circumstances, UEs may experience delays in data reception (e.g., low latency) which may negatively impact user experience and performance of certain extended reality (XR) applications running on the UE. In addition, increasing the functionality of a UE device can place a significant strain on the battery life of the UE device. For example, certain applications running high-definition graphics may require increased power use in order to process said graphics. Thus, it is very important to also reduce power requirements in UE device designs while allowing the UE device to maintain good transmit and receive abilities for improved communications.

To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for coordinating communication and providing power saving techniques for extended reality applications operating in a wireless communication system.

In some embodiments, a user equipment (UE) may establish a connection with a network for transmission of a plurality of data bursts further comprising a plurality of data segments. The UE may transmit, to the network, a first data segment corresponding to a first quality of service flow identifier (QFI) associated with a first quality of service (QoS) flow and a second data segment corresponding to a second QFI associated with a second QoS flow.

According to some embodiments, a first data burst of the plurality of data bursts may include the first data segment and the second data segment. Additionally, or alternatively, a first data burst of the plurality of data bursts may include the first data segment and a second data burst of the plurality of data bursts may include the second data segment. In some embodiments, the first data segment may correspond to a first application data unit (ADU) or first slice and the second data segment may correspond to a second ADU or second slice.

According to further embodiments, the UE may be configured to map one or more data segments of the plurality of data segments to one or more QFIs based on an indication of at least one of expiry of a timer, a sequence number, a periodicity, one or more errors, and one or more measured conditions. In some embodiments, the UE may be configured to map one or more data segments of the plurality of data segments to one or more QFIs based on at least one of a slice type, a frame type, a modulo operation, and a sequence number.

In some embodiments the plurality of data bursts may be transmitted according to at least one of one or more configured grants (CGs), one or more dynamic grants (DGs), and one or more instances of the one or more CGs or one or more DGs. Furthermore, the one or more CGs or one or more DGs may be configured to have one or more periodicities between the one or more instances of the one or more CGs or one or more DGs, according to some embodiments.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
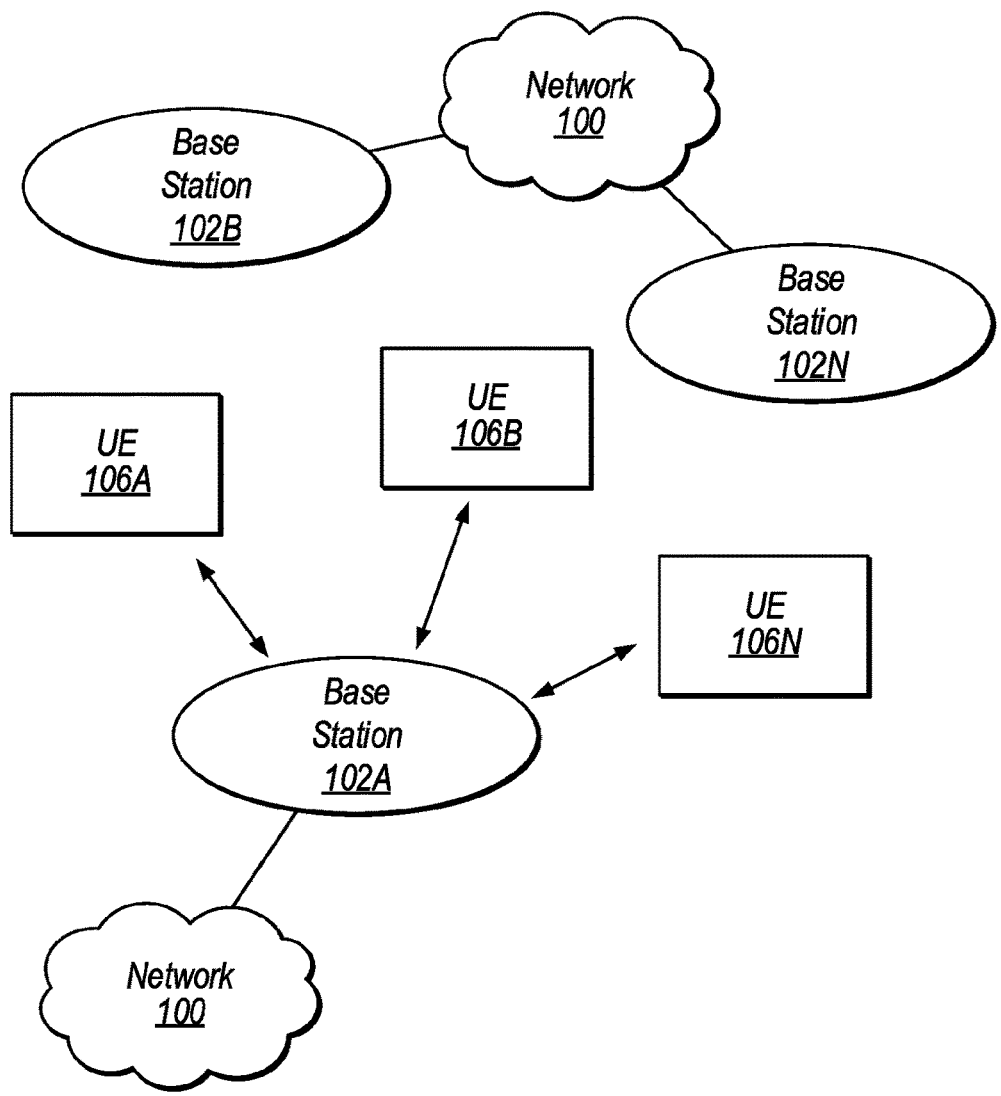
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

3GPP: Third Generation Partnership Project
TS: Technical Specification
RAN: Radio Access Network
RAT: Radio Access Technology
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GC: 5G Core Network
RRC: Radio Resource Control
MAC-CE: Media Access Control-Control Element
DCI: Downlink Control Information
XR: Extended Reality
AF: Application Function
AS: Application Server
ADU: Application Data Unit
DN: Data Network
PDCP: Protocol Data Convergence Protocol
SDU: Service Data Unit
NAL: Network Abstraction Layer
RTP: Real-time Transport Protocol
RTCP: Real-time Transport Control Protocol
QoS: Quality of Service
QFI: Quality of Service Flow Identifier
TX: Transmission/Transmit
RX: Reception/Receive
DRB: Data Radio Bearer
SN: Sequence Number
CG: Configured Grant
DG: Dynamic Grant
AS: Access Stratum
NAS: Non-Access Stratum
LCH: Logical Channel
BLER: Block Error Ratio
TB: Transport Block
L1: Layer-1
PDCCH: Physical Downlink Control Channel Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet.

In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™ iPhone™), laptops, wearable devices (e.g. smart watch, smart glasses), head-mounted displays, VR displays, XR devices, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
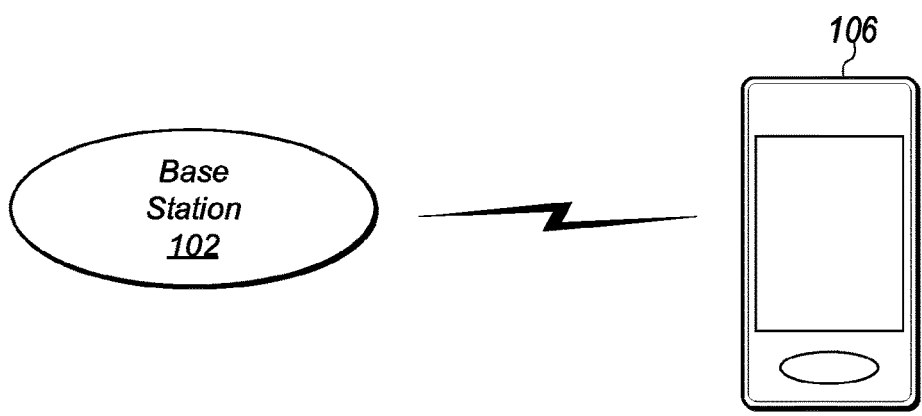
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be abase transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (e.g., a processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
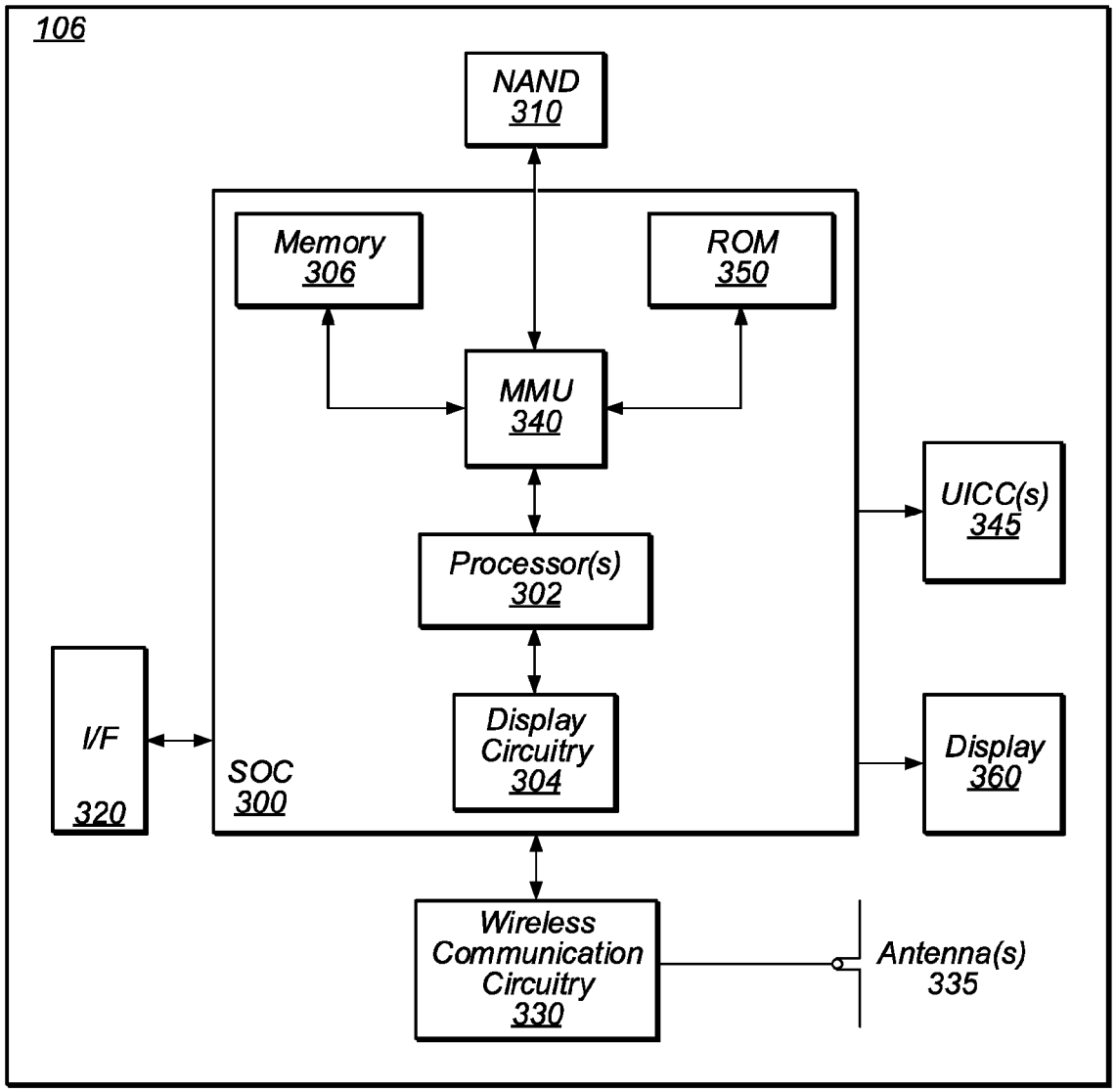
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
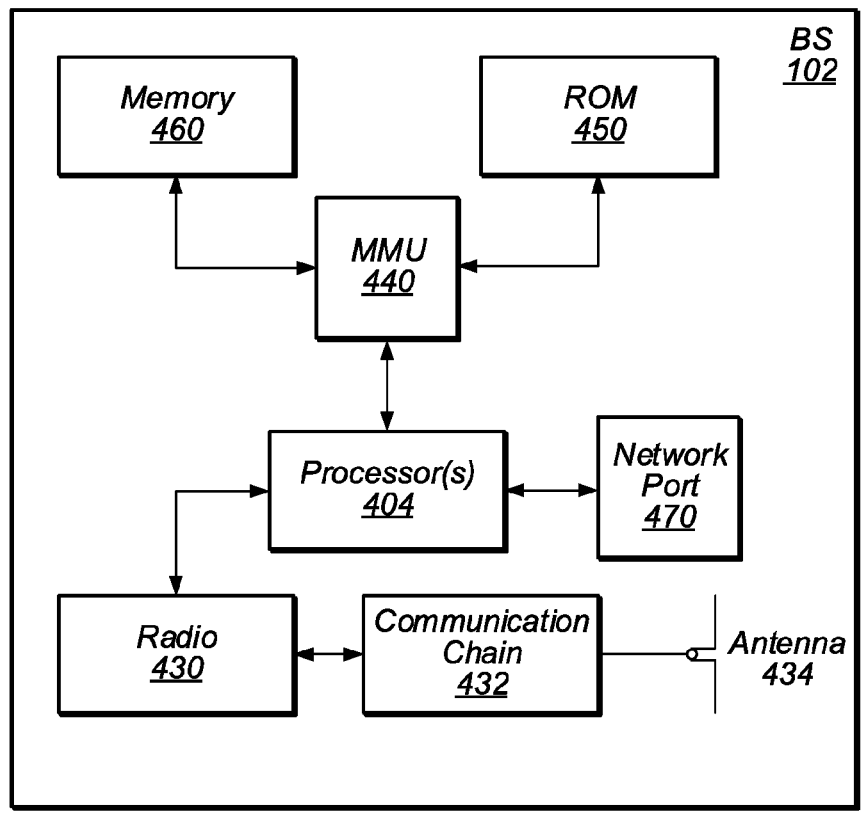
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
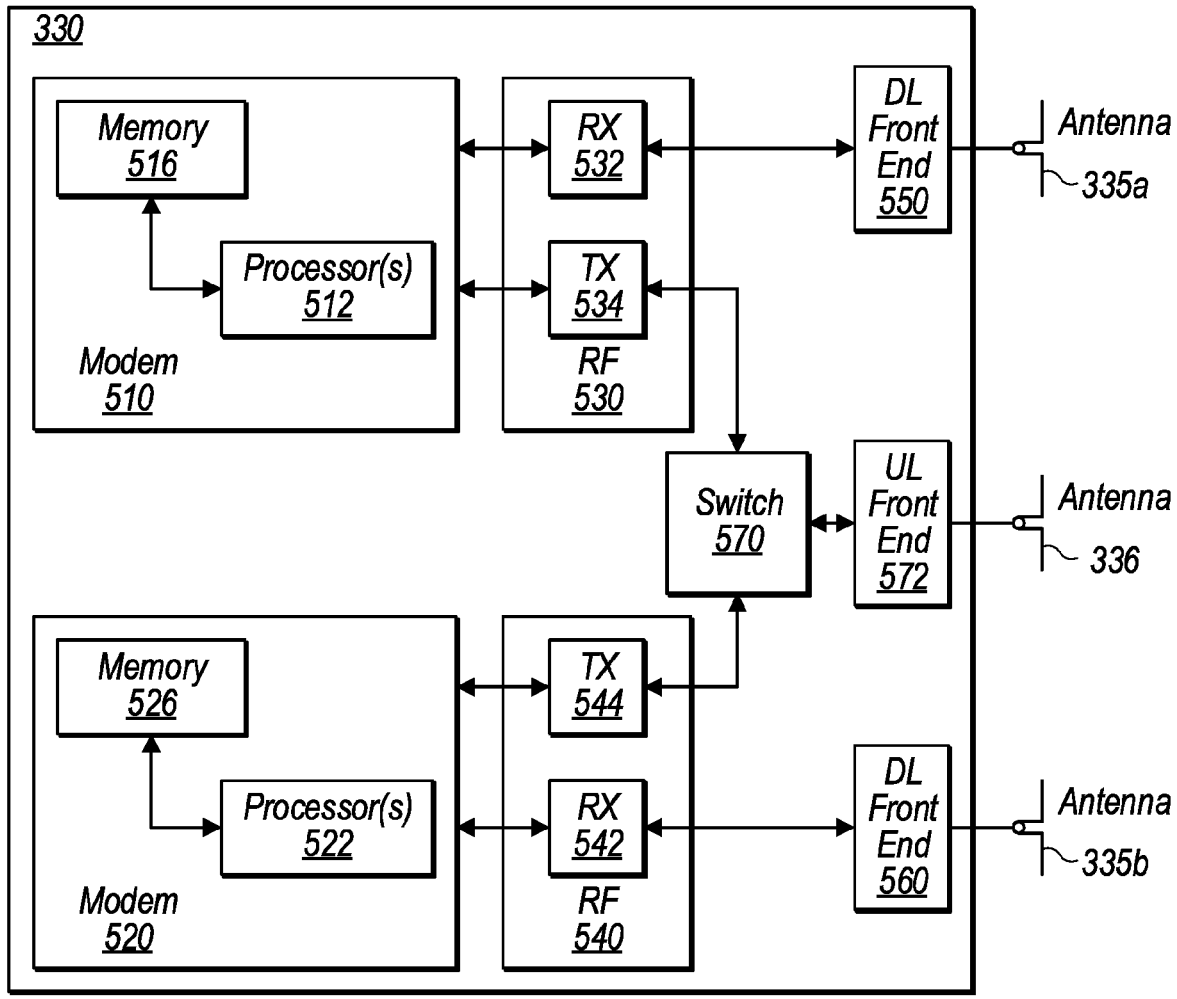
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

Figure 6:
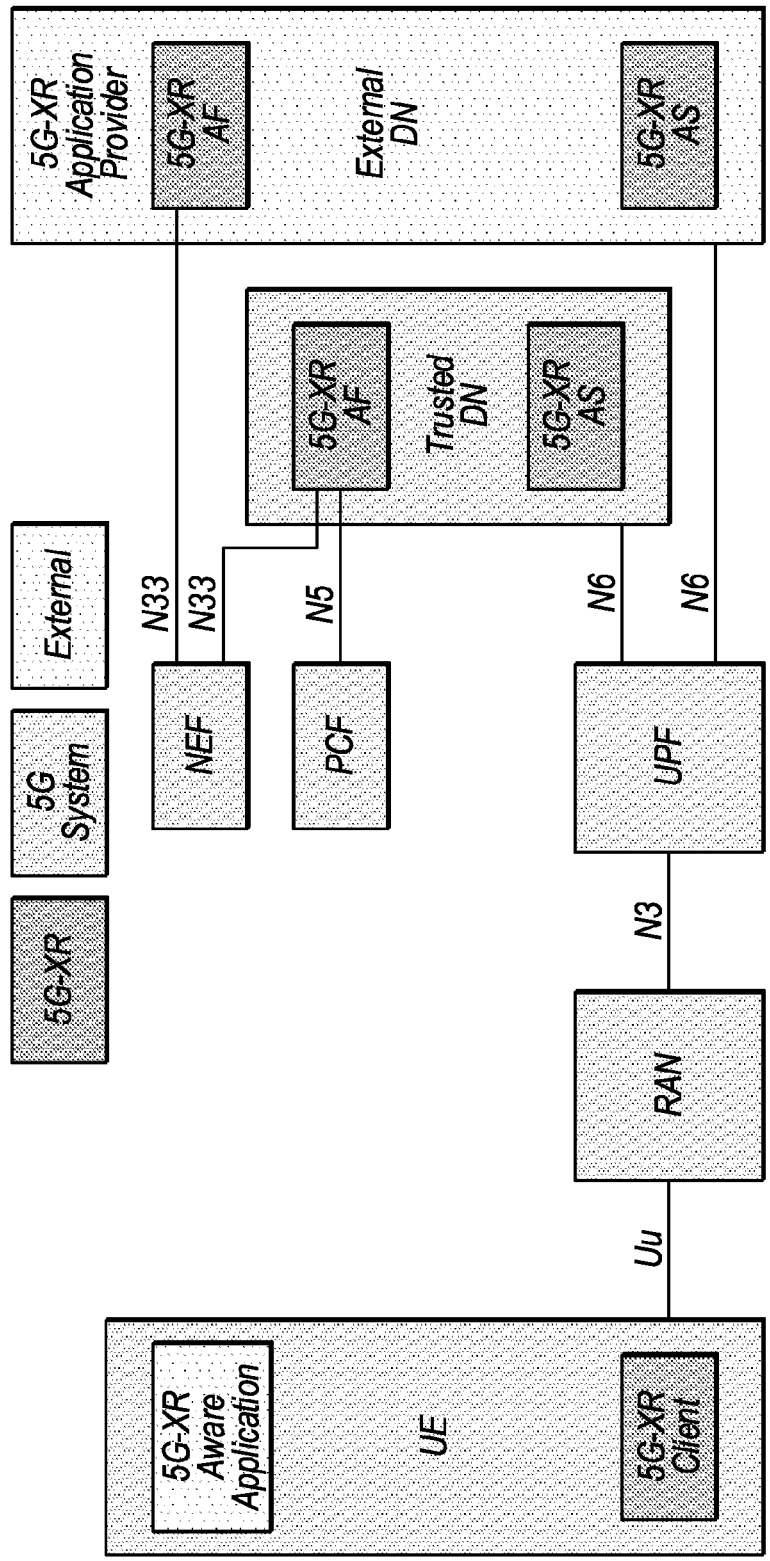
FIG. 6 illustrates a wireless communication network for an extended reality (XR) application, according to some embodiments.

FIG. 6—Extended Reality Wireless Communication Network

FIG. 6 illustrates a wireless communication network for an extended reality (XR) application, according to some embodiments. More specifically, FIG. 6 illustrates a user equipment (UE) running a 5G-XR Aware Application that may utilize a 5G-XR Client to facilitate the network communications necessary to receive and/or transmit necessary data or information such that the XR application performs as intended. In order to facilitate said communications, the 5G-XR client may be connected to a radio access network (RAN) via a Uu interface. Furthermore, the RAN may be connected to a user plane function (UPF) via a N3 interface. In some embodiments, the UPF may utilize a N6 interface be further connected to an External Data Network (DN) operating as a 5G-XR Application Provider and including a 5G-XR Application Function (AF) and 5G-XR Application Server (AS).

Additionally or alternatively, the UPF may use a N6 interface to be further connected to a Trusted DN comprising similar a similar pair of 5G-XR AF and 5G-XR AS, according to some embodiments. Furthermore, the 5G-XR AF may be connected to a policy control function (PCF) via a N5 interface and a network exposure function (NEF) via a N33 interface. Additionally or alternatively, the 5G-XR AF of the External DN may also be connected to the NEF via a separate N33 interface. Accordingly, the RAN may utilize these networks and application functions and servers to provide the UE (via the 5G-XR client) with the necessary data streams such that the 5G-XR Aware Application performs in an ideal fashion. While FIG. 6 illustrates one example of a wireless communication network for an XR application which has been described in detail, numerous variations and modifications of the wireless network will be apparent to those skilled in the art.

Figure 7:
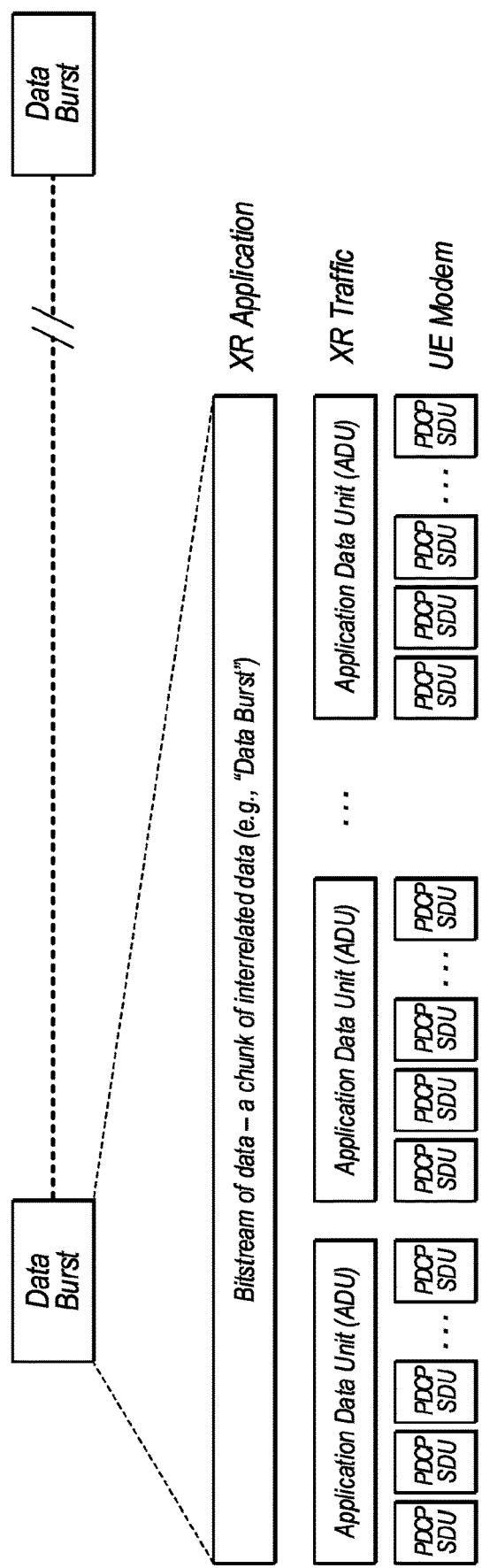
FIG. 7 illustrates the different segments or portions of an extended reality application data burst, according to some embodiments.

FIG. 7—Extended Reality Data Bursts

FIG. 7 illustrates the different segments or portions of an extended reality application data burst, according to some embodiments. For example, XR applications may operate using Application Data Units (ADUs) or data bursts represented by larger segments of data where each segment of application layer data may further consist of a series of multiple IP packets. Such application layer data may be typically delivered in a burst and often in a relatively periodical fashion. Furthermore, a data burst may consist of an application layer bitstream mapped to a set of application data units (ADUs) where each ADU is transmitted in a number of smaller data packets such as real-time transport protocol (RTP) packets mapped to packet data convergence protocol (PDCP) service data units (SDUs) which may be utilized by a UE modem, for example. Moreover, an ADU may contain a slice or a slice partition. Slices are segments of the application layer bitstream.

For example, in the case of an audio codec, an ADU may be referred to as an audio frame. Additionally or alternatively, in the case of video compression standards such as Advanced Video Coding (AVC, e.g., H.264) or High Efficiency Video Coding (HEVC, e.g., H.265), an ADU may be referred to as a network abstraction layer (NAL) unit (NALU).

Furthermore, while more recent (e.g., 5G) QoS mappings may primarily apply to single data packets (for packet error rates and packet delay budgets, for example) or use an averaging period for the bitrate, in some cases XR data traffic may require a series of packets such as an ADU and/or a slice to perform an operation (e.g., a slice to decode a video frame). These units of slices and ADUs play an important role in how QoS is applied for XR applications and the related data transfers between UEs and the network.

In some embodiments, a slice may represent a sequence of packets that includes necessary information to reconstruct a video frame. Furthermore, slices may be considered segments of the bitstream (e.g., the application layer bitstream corresponding to the XR application) that can be reconstructed independently from other slices within the same picture. For example, in H.264, a slice may be considered a data structure (with special encoding) that can be decoded independently from other slices of the same picture, in terms of entropy coding, signal prediction, and residual signal reconstruction. In other words, in some XR or graphic embodiments, a slice may either be an entire picture or a region of a picture and therefore may be considered a basic independent spatial element.

Additionally, an error in one slice may only apply to the same slice and not affect other slices. Similar principles may apply to other codec types. For example, different slice types such as intra-frames (I-frames), predicted frames (P-frames), and bidirectional frames (B-frames), switching P-slices (SP-slices), switching I-slices (SI-slices), and switching slices (S-slices) may have different compression rates and therefore result in transmissions with varying reliabilities. Moreover, a slice may come within its own NAL unit (e.g., an ADU) at the RTP level. In some cases, multiple RTP packets may be required to transfer one single video frame (e.g., between 2 and 10 packets and possibly more). Similar principles may also apply to other codecs used for XR.

In some embodiments, application data units (ADUs) may be used, for example, as NAL units (NALU) for video traffic (e.g., XR traffic). A NAL unit (or ADU) may further contain a slice or a slice data partition and may specify a generic format for use in both packet-based and bitstream systems. In some embodiments, an ADU may be mapped to multiple packets (e.g., IP packets). According to some embodiments, the format of NAL units may be identical for both packet-based transport and byte stream with the exception that each NAL unit may be preceded by a start code prefix and extra padding bytes in the byte stream format. Moreover, a set of NALUs (NAL units) that have been decoded to result in a decoded picture made up of one or more slices may be considered as an Access Unit (AU).

Communication Coordination and Power Saving Techniques for Extended Reality Applications According to some of the embodiments described herein, extended reality (XR) may include real and virtual environments as well as their combinations in addition to the human-machine interactions generated by computer technology and certain wearable devices. For example, XR may include such reality forms as augmented reality (AR), mixed reality (MR), and virtual reality (VR) as well as the areas interpolated between them. Moreover, the levels of virtuality may range from partial sensory inputs to immersive virtuality.

In mobile devices supporting extended reality (XR) capabilities, some XR services may exhibit deterministic behavior due to defined quality of service (QoS) parameters. For example, certain XR services may need to transmit and/or receive multiple streams of data types which correspond to different QoS requirements. In other words, certain data streams or service data flows (SDF) may be associated with certain QoS parameters which efficiently accommodate the transmission and reception of said data streams based on the associated QoS parameters. For example, a data stream or SDF including video frames may correspond to a certain QoS parameter set and a QoS rule (e.g., a packet filter) while another data stream or SDF including audio information may correspond to a different QoS parameter set and QoS rule (e.g., a packet filter).

In some embodiments, the UE may be able to autonomously derive a QoS rule. Each data stream or SDF may be mapped or transmitted as a sequence of slices or a series of ADUs. Additionally, the payload of the XR data may often be transmitted and received periodically. XR services may benefit from utilizing multiple configured grants (CGs), dynamic grants (DGs) and downlink (DL) semi-periodic scheduling (SPS) for streams to reduce latency.

Moreover, XR data traffic (e.g., transmission/reception between the UE and the network) may involve multiple QoS flows are mapped to the same data radio bearer (DRB) and/or logical channel (LCH). Furthermore, each QoS flow may have its own QoS forwarding treatment. Accordingly, if a different QoS forwarding treatment is needed for each of the QoS flows over the air interface, the network may map them to different DRBs. However, this may not always be possible given the larger amount of traffic flows in XR. In other words, the network may be incentivized to map different QoS flows to different DRBs/LCHs and/or CGs. Additionally or alternatively, there may be certain configurations in which it may be beneficial to map multiple QoS flows to the same DRB or LCH.

In order to facilitate a mapping of application layer data to network resources, some networks may assign certain QoS flows for application information transmitted in data bursts in order to establish a higher priority and/or protection of the transmitted data such that data loss and latency is minimized. For example, QoS Flow IDs (QFIs) may be used to identify QoS flows in the network. In some embodiments, the QoS flows may require a guaranteed flow bit rate (GBR) or may not require a GBR (non-GBR). Additionally or alternatively, some QoS flows may be utilized for mission critical GBRs (e.g., Delay Critical QoS flows). These GBRs associated with the QoS flows may allow for higher efficiency data transfers for higher priority transmissions which may further result in an enhanced user experience. The apparatuses, systems, and methods for mapping QoS flows corresponding to the application data units or slices being transmitted may increase efficiency of the UE and base station operations by further reducing unnecessary transmissions/receptions. Accordingly, the UE and/or base station may experience increased power conservation due to these mappings.

Accordingly, there is a desire to optimize UE and base station power savings based on XR traffic pattern characteristics. Additionally, due to payload data (such as I-frames and P-frames) contained in ADUs or data bursts differing in severity (significance) and entropy, there also exists a desire to better protect and/or control/manage certain parts of the payload such that the transmissions are more reliable through enhanced QoS. Moreover, certain payload data may be mixed with real-time transport control protocol (RTCP) on the same DRB and the PDCP layer may discard data packets if the data is not delivered on time. This discarded data may include I-frames of a video sequence as well as RTCP feedback (both more critical than P-frames, for example) for lost RTP packets. Furthermore, if RTP and RTCP packets are both carried on the same DRB or transmitted in the same transport block or PDCP SDU, the probability that critical data is lost due to unrecoverable errors on hybrid automatic repeat request (HARQ) or radio link control (RLC) is higher. Accordingly, improvements are desired.

Figure 8:
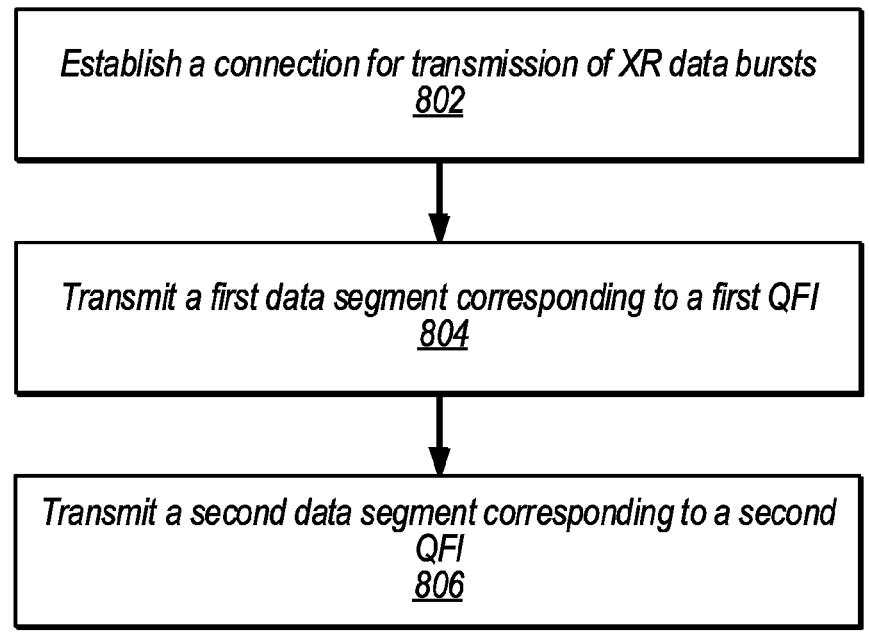
FIG. 8 is a flow diagram illustrating example aspects of a method for mapping quality of service flow identifiers (QFIs) to data segments of XR data bursts, according to some embodiments.

FIG. 8—Mapping Quality of Service Flow Identifiers (QFIs) to Data Segments of XR Data Bursts FIG. 8 is a flow diagram illustrating example aspects of a method for mapping quality of service flow identifiers (QFIs) to data segments or portions of XR data bursts, according to some embodiments. More specifically, FIG. 8 details how a user equipment (UE) or, in some embodiments, a network side entity may assign or map certain QoS parameters to corresponding XR data slices or ADUs such that the XR data is transmitted and received more efficiently.

For example, in 802, a UE may communicate with a network in order to establish a connection with the network. Once the connection has been established, the UE may be able to transmit or relay extended reality (XR) data bursts to the network regarding an XR application running on the UE. As described above in regard to FIG. 6, the UE may accomplish this via the Uu interface between the UE and the network (e.g., a base station acting as part of the RAN). Accordingly, once the connection to the network has been established, the UE may begin to transmit the XR data bursts to the network through use of a configured grant (CG). Additionally or alternatively, 802 may be performed by a network entity (e.g, a base station and/or core network (CN). For example, the network may initiate communications with the UE in order to establish a connection to further facilitate XR data burst transmissions from the network to the UE.

In 804, the UE may transmit a first data segment corresponding to a first QFI. In some embodiments, the UE may perform mapping operations such that certain QoS flows are assigned or mapped to corresponding data segments of the data bursts (e.g., slices and/or ADUs). For example, a data burst, which may be transmitted over the air in a dedicated configured grant (CG), may include data or information for an XR application in the form of one or more slices and/or ADUs. Accordingly, the UE may map a first data segment or data portion (e.g., a data slice or ADU) of the data burst to a first QoS flow. In doing so, the first data segment (mapped to a first QoS flow) may have a traffic forwarding treatment corresponding to the first QoS flow's traffic pattern and QoS parameters. Additionally or alternatively, 804 may be performed by a network entity such as a base station and/or core network. For example, in some embodiments, the network may be supporting an XR application running on the UE (e.g., by providing external computing resources) and further need to transmit related data bursts to the UE. Accordingly, the network may utilize a similar method in 804 to map a first data segment of the data burst to a first QoS flow. In doing so, the network may link or associate the first data segment (corresponding to the first QoS flow) such that it has a traffic forwarding treatment corresponding to the first QoS flow's traffic pattern and QoS parameters. In some embodiments, the exact mapping between QoS flows and data segments may be established by the network or defined based on predefined rules.

In 806, the UE may further transmit a second data segment corresponding to a second QFI. In some embodiments, the UE may map a different QoS flow (e.g., a second QFI) to a second data segment of the data burst which may further be transmitted via a second configured grant (CG). In doing so, the second data segment (associated with a second QFI) may have different QoS forwarding treatment and QoS parameters (associated with latency, reliability, precedence, etc.) compared to that of the first data segment. Accordingly, the data segments (e.g., slices/ADUs) may have different or preferred treatment when being transmitted to the network for support of the XR application. Additionally or alternatively, 806 may be performed by a network entity such as a base station and/or core network. For example, in some embodiments similar to 806, the network may further map a different QoS flow (e.g., a second QFI) to a second data segment of the data burst which may have been transmitted via a second semi-periodic scheduling (SPS) transmission. In doing so, the network may configure a second data segment (associated with the second QFI) such that it has a traffic forwarding treatment corresponding to the second QFI parameters (different from the first QFI).

These XR data bursts may be transmitted according to the QFIs that have been mapped to the corresponding data segments of the data bursts which further include the mappings of one or more QFIs to the one or more slices/ADUs of the data burst. Additionally, or alternatively the QFIs may be included in the transmission. Accordingly, the base station and/or the core network may be able to control how the data segments in the data bursts are to be treated when being transmitted to the UE for the XR application. As discussed above in regard to 804 and 806, this may allow for preferential treatment for certain slices or ADUs (e.g., data segments) which may require higher fidelity transmissions. In effect, the network's mapping of certain QFIs to certain XR data segments may improve the performance of the XR application running on the UE through more efficient and higher fidelity transmissions. Accordingly, once the UE receives the XR data, it may further process and display the data according to the XR application running on the UE. For example, a XR data burst may include video and/or multimedia frames that require certain codecs to decode and the UE may display these video and/or multimedia frames once decoded.

Figure 9:
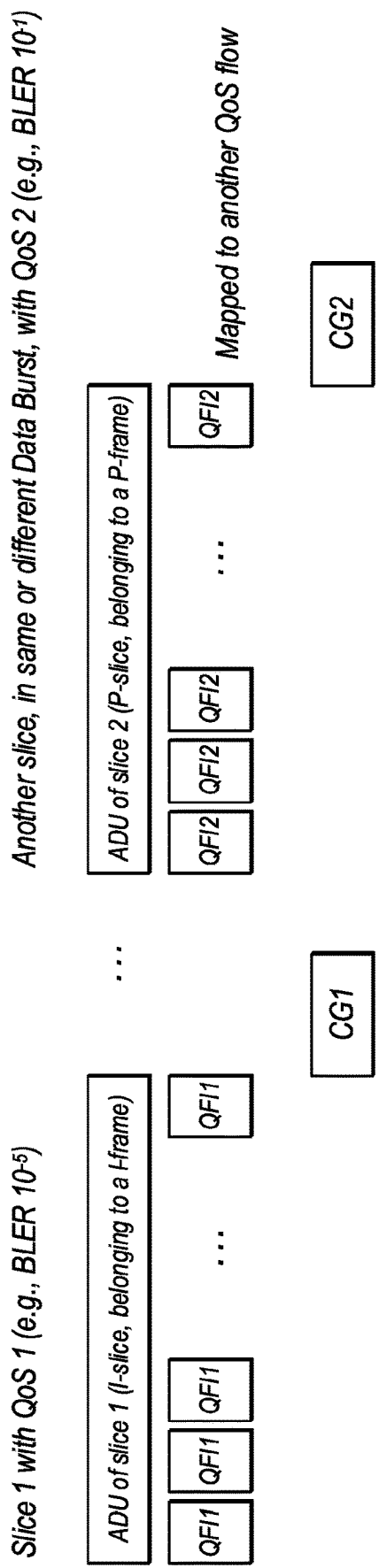
FIG. 9 illustrates a XR application data burst that has been modified to include mappings of QFIs to certain data segments, according to some embodiments.

FIG. 9—Mapping of ADUs and QoS Flows

FIG. 9 illustrates an extended reality application data burst that has been modified to include mappings of QFIs to slices and/or ADUs, according to some embodiments. For example, a single application layer data stream as part of the payload (such as I-frames and P-frames in video, a certain slice, or certain periodically re-occurring packets) may benefit from transmission with another or a different QoS. One method to achieve this may be to map those payload data bytes to another or different QoS flow. This may be typically done on a per packet basis (e.g., NAL units (ADU), IP packets, PDCP SDUs, etc.). In some embodiments, the method may apply to a single application layer frame such that certain parts in the payload are treated with different reliability (e.g., different QoS). Additionally or alternatively, the method may be applied to different ADUs, data bursts, among other data segments.

For example, FIG. 9 illustrates a first slice (e.g., Slice 1) of a first configured grant (CG1) with a corresponding first QoS (QoS 1) further corresponding to a block error ratio (BLER) on the order of $10^{-5}$. Furthermore, slice 1 (including the shown ADU) may be characterized as an I-slice belonging to an I-frame. Similarly, FIG. 9 also illustrates a second slice (e.g., Slice 2) of a second configured grant (CG2) (which may or may not be included in the same data burst) with a corresponding second QoS (QoS 2) with a block error ratio (BLER) on the order of $10^{-1}$. Furthermore, slice 2 (including the shown ADU) may be characterized as a P-slice belonging to a P-frame. Accordingly, because the PDCP SDUs of slice 1 and slice 2 have been mapped to different corresponding QoS flows (e.g., QFI1 and QFI2, respectively), the slices can be treated differently with regard to priority or protection (e.g., latency, reliability) upon transmission.

In some embodiments, the method may include mapping a slice or ADU to a certain QoS flow (e.g., a QFI) based on slice type (e.g., in RTP or an ADU) or a frame type (I-frame, P-frame, B-frame, etc.). Additionally or alternatively, the network may create a QoS rule with a packet filter corresponding to an ADU or slice such that the QoS rule is based on the inherent characteristics of the slice or ADU. For example, in some embodiments the packet filter may be established based on slice types in which ADUs may be mapped to different QFIs and different packet filters. Further, the associated QoS rules may have different precedence values. In some embodiments, an intermediate filtering rule (e.g., between the XR application and IP flows) may be applied such that ADUs or slices are mapped to different IP flows (or SDFs). Alternatively, the UE may derive a QoS rule (thereby creating a packet filter that maps IP flows to a different QFI) which temporarily applies to a slice or ADU based on trigger events or configuration from upper layers. In some embodiments, this may further indicate the start and the end of a slice or ADU. Additionally or alternatively, the method may include mapping a slice or ADU to another or different QoS flow based on sequence number (SN). In some embodiments, the SN mapping may be based on a modulo operation according to a predefined pattern (e.g., every x number of packets). Accordingly, different QFIs may receive different QoS treatment via mapping slices to different QFIs and different CGs and/or data radio bearers (DRBs).

In some embodiments, the network's or UE's mapping of QFIs to data segments (e.g., slices/ADUs) of certain CGs or DRBs may be based on pre-defined times such that the reliability (e.g., the QoS) within the same CG or DRB varies temporarily. Additionally or alternatively, in mapping certain QFIs to certain slices/ADUs, the base station may be able to prioritize I-frame data and RTCP feedback packets over P-frames, separate critical data to another carrier, or carry them on a separate QoS flow or DRB.

Furthermore, the network or the UE may be able to utilize cross-layer dependencies such as fields in the RTP header indicating the relative importance of a packets (e.g., the transaction identifier (TID) field for H.265/HEVC and other slice related information) to establish non-access stratum (NAS) QoS rules for mappings between IP packets and QoS flows. Moreover, in order to assist higher layers generate suitable ADUs where possible, the access stratum (AS) may be able to expose radio transmission scheduling and QoS related information (such as transmission timing, periodicity, byte size, reliability, and latency) of allocated radio resources to the XR application running on the UE.

According to some embodiments, for a given set of QoS flows or DRBs, the PDCP layer may prepare data by triggering ciphering and integrity protection on critical or high priority SDU data first. As a result, these higher priority SDUs may be ready for transmission first similar to signaling radio bearers (SRBs) which are typically treated first. Additionally or alternatively, the PDCP for certain DRBs may be configured with a logical channel (LCH) priority by RRC. In some embodiments, if a QFI is considered a higher priority, the service data adaption protocol (SDAP) layer may also submit data to the PDCP in an order of priority and may further be configured by RRC accordingly.

Situational QoS

According to some embodiments, it may be beneficial to temporarily boost the QoS for certain data bursts (e.g., slices/ADUs). For example, payload data such as I-frames and P-frames contained in ADUs or data bursts may differ in severity (e.g., significance) and entropy. Additionally, control data communications handled via real-time transport control protocol (RTCP) may require better protection (e.g., enhanced levels of QoS) as well.

In some embodiments, during important transmission periods a QoS flow may enter a phase of higher reliability or a phase with modified or augmented QoS settings, and then return to its normal QoS level. This may be used to protect the most important parts of an application layer message or ADU, a complete ADU, or even special messages and/or packets of higher significance. To achieve this, a QoS flow or logical channel may be allowed to temporarily boost, modify or augment its QoS setting for a period of time during which another QoS level or another reliability is applied. For example, for an ongoing video call with a certain (constant) codec rate, I-frames and RTCP packets may be received relatively periodically (e.g., for feedback). To protect these crucial parts during a transmission period, the connection may benefit from entering a state of higher reliability. Moreover, in such a protected phase or period, the UE may use PDCP duplication, rely on a configured grant with a higher number of TB repetitions, different MCS, or even boost the connection to attain higher reliability. Additionally or alternatively, a variety of different settings may be possible and the network or UE may be capable of configuring these settings.

In some embodiments, the UE may be configured with a secondary QoS profile or a secondary set of QoS parameters and/or QoS characteristics for the same QFI and/or 5G QoS Identifier (5QI). Moreover, according to some embodiments, the network or the UE itself may be able to introduce different QoS severity (e.g., significance/priority) levels within the same stream of a QoS flow such that the UE automatically switches to the next better QoS/QFI parameter (e.g., the next BLER, or the next periodicity) in a list of parameter values.

Accordingly, there may be a number of methods or means of triggering a change in QoS or the QFI associated with a certain slice or ADU in a XR application data burst. In some embodiments, the network may be configured to switch the mapping of a QFI to a slice or ADU to a higher reliability or a secondary QoS based on sequence number (SN). For example, the mapping of a QFI may be characterized such that every $N^{th}$ RTP SN, $N^{th}$ PDCP SDU, $N^{th}$ application layer packet or $N^{th}$ IP packet may belongs to a certain QoS flow, according to some embodiments. Furthermore, in some embodiments, N may be characterized or determined by a statistical distribution function (e.g., a Pareto distribution or a truncated Gaussian distribution). In some embodiments, the phase of higher reliability or a secondary QoS may be characterized such that the QoS flow remains in that state for a configurable number of packets (e.g., 1 . . . M). Additionally or alternatively, a switch to a higher reliability or a secondary QoS profile may be configured to occur at every $N^{th}$ ADU as a whole and/or for different slice types. In some embodiments, the application layer may identify the start packet and the end packet associated with a slice or ADU and indicate the same to the lower layers which may further identify and trigger a period of modified reliability or QoS for the associated traffic.

In some embodiments, a configured grant (CG) may be characterized such that the reliability of a CG is switched periodically. For example, according to some embodiments, the network or UE may utilize a number of configured grants for the data burst(s) such that every 2nd (or $N^{th}$) CG is associated with higher reliability or a higher number of transport block (TB) repetitions.

Furthermore, in some embodiments, an XR application or related connection may have a set of secondary QoS characteristics with better reliability or augmented settings which may be automatically triggered based on error events, a history of earlier abnormal events, or a location (e.g., when it can be inferred from the history that another failure is likely to happen).

According to some embodiments, the network or UE may be configured to enable or trigger a period of time with higher reliability automatically based on abnormal or error events in the UE. For example, the network may trigger a period of higher reliability based on feedback or radio conditions (e.g., below a certain RSRP/RSRQ) or the UE. Additionally or alternatively, a temporary modification of reliability may also be based on a timer such that a defined period (e.g., with start and stop times) with augmented QoS settings is specified.

Figure 10:
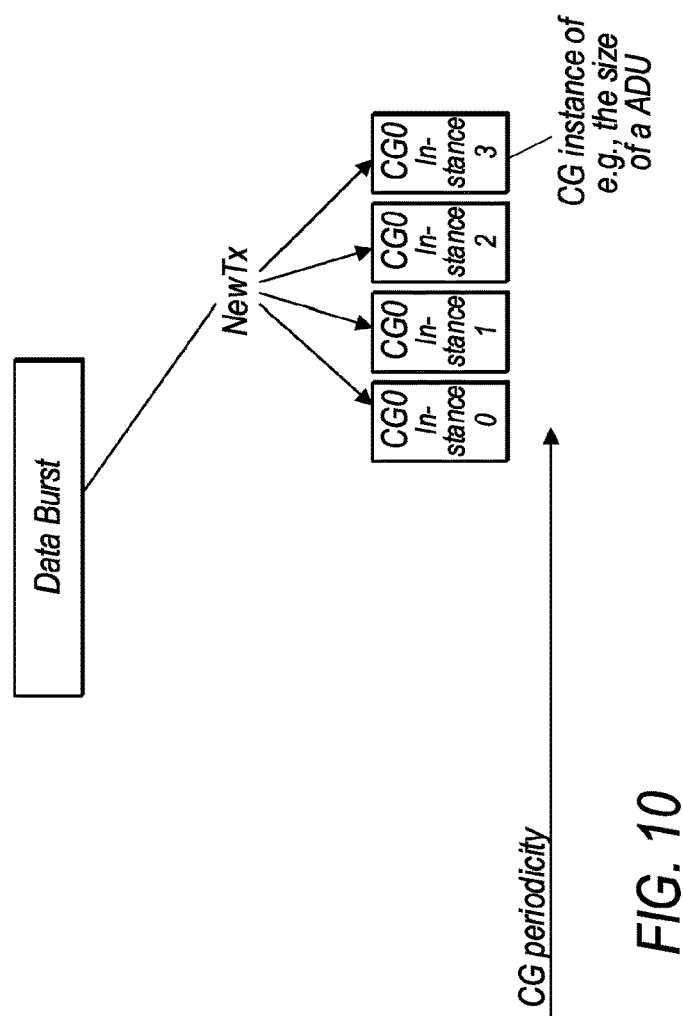
FIG. 10 illustrates an example transmission of an extended reality application data burst utilizing one or more instances of a configured grant, according to some embodiments.
Figure 10:
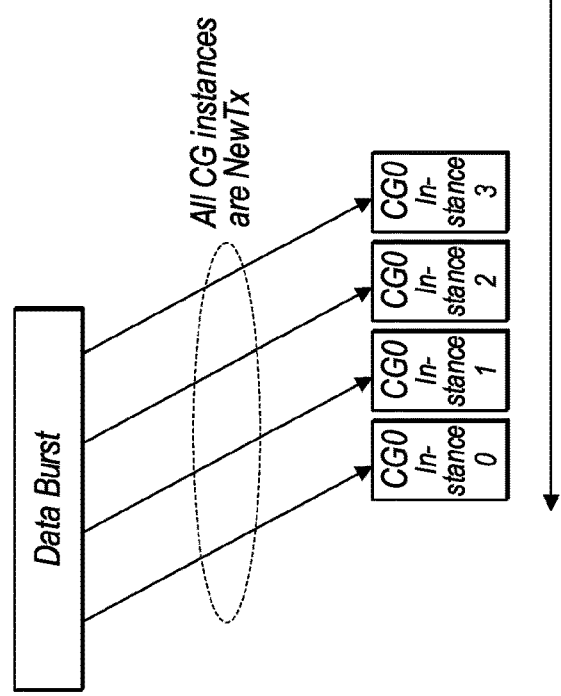

FIG. 10—New Configured Grant Type Based Solution

FIG. 10 illustrates an example transmission of an extended reality application data burst utilizing one or more instances of a configured grant, according to some embodiments.

For an ideal transmission of the TB/CG, the entire data burst would fit into one TB or CG. However, in some cases, traditional configured grants may utilize TB repetition in order to accommodate larger data sets/bursts while providing increased reliability. For example, a first data burst associated with a CG may be transmitted followed by one or more subsequent TBs repeated on the same CG. Accordingly, the next data burst would (and subsequent new transmission and further TB repetitions) would be transmitted according to the periodicity of the CG.

In some embodiments, if the data burst is sufficiently large due to a large number of PDCP SDUs, the packet delay budget (PDB) may allow to spread the PDCP SDUs over several TBs rather than attempting to combine the data burst in a single transport block (TB). Furthermore, the grant size available may not be large enough for a single slot of this size. Additionally or alternatively, degraded radio conditions may not allow for the use of a large grant size. In this case, multiple configured CG instances may be an option.

According to some embodiments, the UE and network may be able to utilize a CG type similar to TB repetition but without repetition for the transmission of XR application data. Instead, the UE may send new data in different instances of a CG. For example, FIG. 10 illustrates $CG_0$ instances 0, 1, 2, and 3 of one data burst. Each one of these instances can be characterized as new transmissions and, in some embodiments, may further correspond to the size of an ADU. Accordingly, one benefit of transmitting the data within multiple instances of a CG may be that the UE would not need to continuously schedule a CG with shorter periodicity. In other words, the UE may not need to skip UL transmission between data bursts or need to send padding (if UL skipping is not configured) in order to transmit the data bursts. Accordingly, this may also allow for better use of radio resources for adjustment to XR traffic patterns in addition to providing power savings and reduced latency. Additionally or alternatively, while configured grants may not be utilized in downlink communications, this solution may also be applied to semi-persistent scheduling (SPS) in downlink assignments, according to some embodiments.

Additional Information

In some embodiments, the grant size of a CG instance might be optionally set based on the size of an ADU. This may require cross-layer interaction or pre-configuration such that a network could implicitly associate a new grant size when the codec rate, periodicity or QoS configuration changes. Such pre-configuration may be signaled separately and/or updated with via a media access control-control element (MAC-CE) or via RRC.

Additionally or alternatively, it may be possible to vary CG parameter configurations for different instances of a CG such that the grant sizes are staggered or a different reliability is associated with each of the different CG instances. According to some embodiments, the network may be able to associate a CG with two periodicities. For example, the network may associate a CG with a first periodicity corresponding to the gap or time between a first CG instance (e.g., CG instance 0) and the next occurrence of CG instance 0 (e.g., the current existing periodicity of a CG configuration). Additionally or alternatively, the network may associate a CG with a second periodicity corresponding to the gap or time between CG instances (0, 1, 2, N). This may provide the benefit such that TB transmissions can be spaced apart more freely.

Accordingly, there may be certain signaling associated with specifying or configuring the number of CG repetition instances that can be used for new transmissions. For example, this operation may use a parameter in the configuredGrantConfig information element (IE) (e.g., newTxK-r18, similar to that of repK for TB repetition) but instead utilize new data on each CG instance rather than performing TB repetition.

In some embodiments, if the data burst size changes too frequently, the actual number of used CG instances may be dynamically indicated via layer-1 (L1) signaling. More specifically, the network may configure the number of CG instances (through parameter such as "newTxK-r18") while the UE dynamically indicates whether it will use all CG instances for a given CG cycle. Accordingly, if the indication from the UE is given early enough (e.g., at the first CG instance), the network may be able to reuse any remaining CG resources.

According to some embodiments and along the lines of the principles discussed above, dynamic grants (DG) could also be enhanced such that a single DCI may be used to schedule multiple consecutive transport blocks with one DG. For example, XR application data burst transmission operation involving DGs may be similar to TB repetition with the exception that the UE may need to transmit new data in each instance of a TB scheduled by such a DG. Accordingly, a MAC may have to create a new MAC protocol data unit (PDU) for each TB instance. However, the use of DGs may facilitate a reduction in signaling overhead and help conserve UE power due to less physical downlink control channel (PDCCH) processing. Moreover, for similar reasons, the network entity (e.g., base station or gNB) may also experience less processing overhead as well. Additionally or alternatively, while dynamic grants may not be utilized in downlink communications, this solution may also be applied to downlink assignments, according to some embodiments.

Example Embodiments

Still another example embodiment may include a device, comprising: an antenna; a radio coupled to the antenna; and a processing element operably coupled to the radio, wherein the device is configured to implement any or all parts of the preceding examples.

Yet another example embodiment may include a method, comprising: by a device: performing any or all parts of the preceding examples.

A further embodiment may include a non-transitory computer accessible memory medium comprising program instructions which, when executed at a device, cause the device to implement any or all parts of any of the preceding examples.

A still further example embodiment may include a computer program comprising instructions for performing any or all parts of any of the preceding examples.

A yet further example embodiment may include an apparatus comprising means for performing any or all of the elements of any of the preceding examples.

Still another example embodiment may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   establishing a connection with a network for transmission of a plurality of data segments, wherein the plurality of data segments is comprised in a bitstream of interrelated data corresponding to an application running on a user equipment (UE);
   transmitting, to the network, a first data segment of the plurality of data segments corresponding to a first quality of service flow identifier (QFI) associated with a first quality of service (QoS) flow of a plurality of QoS flows; and
   transmitting, to the network, a second data segment of the plurality of data segments corresponding to a second QFI associated with a second QoS flow of the plurality of QoS flows.

2. The method of claim 1, further comprising:
   associating one or more QoS flows of the plurality of QoS flows with a modified set of QoS parameters.

3. The method of claim 2, wherein the modified set of QoS parameters is applied for a period of time subsequent to the UE automatically switching to a previously used or a previously unused set of QoS parameters.

4. The method of claim 1, further comprising
   mapping one or more data segments of the plurality of data segments to one or more QFIs based on at least one of:
   a capability of the network to create a QoS rule with a packet filter corresponding to an application data unit (ADU) or slice associated with the application, wherein the QoS rule is based on at least one of inherent characteristics of the slice or ADU, an intermediate filtering rule, or a capability of the UE to autonomously derive the QoS rule.

5. The method of claim 1, wherein a first data burst of a plurality of data bursts comprises the first data segment and the second data segment.

6. The method of claim 1, wherein a first data burst of a plurality of data bursts comprises the first data segment and a second data burst of the plurality of data bursts comprises the second data segment.

7. The method of claim 1, wherein the first data segment corresponds to a first application data unit (ADU) or first slice associated with the application and the second data segment corresponds to a second ADU or second slice associated with the application.

8. The method of claim 1, further comprising:
   mapping one or more data segments of the plurality of data segments to one or more QFIs based on at least one of a slice type, a frame type, a modulo operation, a sequence number (SN), an indication of expiry of a timer, a periodicity, one or more errors, or one or more measured conditions,
   wherein a SN mapping is based on the modulo operation according to a predefined pattern, and wherein a mapping of a QFI to a slice or ADU is switched to a higher reliability or a secondary QoS based on a SN.

9. The method of claim 1, wherein the plurality of data segments is transmitted corresponding to one or more instances of one or more configured grants (CGs) or one or more dynamic grants (DGs).

10. An apparatus, comprising:
a baseband processor configured to cause a wireless device to:
establish a connection with a network for transmission of a plurality of data segments, wherein the plurality of data segments is comprised in a bitstream of interrelated data corresponding to an application running on the wireless device;
transmit, to the network, a first data segment of the plurality of data segments corresponding to a first quality of service flow identifier (QFI) associated with a first quality of service (QoS) flow of a plurality of QoS flows; and
transmit, to the network, a second data segment of the plurality of data segments corresponding to a second QFI associated with a second QoS flow of the plurality of QoS flows.

11. The apparatus of claim 10, wherein the baseband processor is configured to cause the wireless device to:
associate one or more QoS flows of the plurality of QoS flows with a modified set of QoS parameters.

12. The apparatus of claim 11, wherein the modified set of QoS parameters is applied for a period of time subsequent to the wireless device automatically switching to a previously used or a previously unused set of QoS parameters.

13. The apparatus of claim 10, wherein the baseband processor is further configured to cause the wireless device to:
map one or more data segments of the plurality of data segments to one or more QFIs based on at least one of:
a capability of the network to create a QoS rule with a packet filter corresponding to an application data unit (ADU) or slice associated with the application, wherein the QoS rule is based on at least one of inherent characteristics of the slice or ADU, an intermediate filtering rule, or a capability of the wireless device to autonomously derive the QoS rule.

14. The apparatus of claim 10, wherein the plurality of data segments is transmitted corresponding to one or more instances of one or more configured grants (CGs) or one or more dynamic grants (DGs).

15. The apparatus of claim 14, further comprising wireless communication circuitry operably coupled to the baseband processor.

16. A method, comprising:
establishing a connection with a user equipment (UE) for transmission of a plurality of data segments, wherein the plurality of data segments is comprised in a bitstream of interrelated data corresponding to an application running on the UE;
transmitting, to the UE, a first data segment of the plurality of data segments corresponding to a first quality of service flow identifier (QFI) associated with a first quality of service (QoS) flow of a plurality of QoS flows; and
transmitting, to the UE, a second data segment of the plurality of data segments corresponding to a second QFI associated with a second QoS flow of the plurality of QoS flows.

17. The method of claim 16, further comprising:
associating one or more QoS flows of the plurality of QoS flows with a modified set of QoS parameters.

18. The method of claim 17, wherein the modified set of QoS parameters is applied for a period of time subsequent to the UE automatically switching to a previously used or a previously unused set of QoS parameters.

19. The method of claim 16, further comprising:
mapping one or more data segments of the plurality of data segments to one or more QFIs based on at least one of:
a capability of the base station to create a QoS rule with a packet filter corresponding to an application data unit (ADU) or slice associated with the application, wherein the QoS rule is based on at least one of inherent characteristics of the slice or ADU, an intermediate filtering rule, or a capability of the UE to autonomously derive the QoS rule.

20. The method of claim 16, wherein the first data segment corresponds to a first application data unit (ADU) or first slice associated with the application and the second data segment corresponds to a second ADU or second slice associated with the application.

* * * * *